(12) United States Patent
Lee et al.

(10) Patent No.: US 9,530,340 B2
(45) Date of Patent: Dec. 27, 2016

(54) CALIBRATOR FOR A DISPLAY SCREEN

(71) Applicant: LG ELECTRONICS INC., Seoul (KR)

(72) Inventors: Kyungwon Lee, Pyeongtaek-si (KR); Juhyeok Ryu, Pyeongtaek-si (KR); Ohkwan Kwon, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/769,751

(22) PCT Filed: Aug. 16, 2013

(86) PCT No.: PCT/KR2013/007390
§ 371 (c)(1),
(2) Date: Aug. 21, 2015

(87) PCT Pub. No.: WO2014/175511
PCT Pub. Date: Oct. 30, 2014

(65) Prior Publication Data
US 2016/0005343 A1    Jan. 7, 2016

(30) Foreign Application Priority Data

Apr. 26, 2013  (KR) .................. 10-2013-0046893

(51) Int. Cl.
*G09G 3/00*    (2006.01)
*G01J 3/02*    (2006.01)
(Continued)

(52) U.S. Cl.
CPC ............ *G09G 3/006* (2013.01); *G01J 3/0202* (2013.01); *G01J 3/0291* (2013.01); *G01J 3/506* (2013.01);
(Continued)

(58) Field of Classification Search
CPC ............ G09G 3/006; G09G 2320/0693; G09G 2360/147; G01J 3/506
See application file for complete search history.

(56) References Cited

U.S. PATENT DOCUMENTS 4,742,387 A * 5/1988 Oshima .................... H04N 9/73
                                                         348/180
5,270,540 A * 12/1993 Skop, Jr. .................. G01J 3/02
                                                         250/239
(Continued)

FOREIGN PATENT DOCUMENTS

JP    2004-246232 A    9/2004
JP    2010-076459 A    4/2010
(Continued)

*Primary Examiner* — Brian Yenke
(74) *Attorney, Agent, or Firm* — Birch, Stewart, Kolasch & Birch, LLP

(57) ABSTRACT

There is disclosed a calibrator configured to calibrate a color of a screen of a display device includes an absorption plate formed of a transformable material, comprising a bottom surface attached to the screen of the display device in a vacuum absorption method; a control portion configured to leave space a first portion of the absorption plate from the screen of the display device; a fixed portion configured to press a second portion of the absorption plate to the screen of the display closely; a rotary portion configured to rotatably coupled to the fixed portion in a horizontal direction and to move the control portion in a vertical direction of the display device, when it is rotated; and a circuit unit mounted in the fixed portion to calibrate the color of the display device, such that the calibrator may be fixed in a precise position of the screen and that the screen calibration can be performed precisely and that the calibrator can be attached even to a tilted screen and used widely.

17 Claims, 12 Drawing Sheets

10 - display device
30 - cable
100 - calibrator
120 - absorption plate
150 - middle cover
190 - top cover

(51) Int. Cl.
*G01J 3/50* (2006.01)
*G06F 3/0489* (2013.01)
*H04N 9/73* (2006.01)

(52) U.S. Cl.
CPC ... *G06F 3/04897* (2013.01); *G09G 2320/0693* (2013.01); *G09G 2360/145* (2013.01); *G09G 2360/147* (2013.01)

(56) References Cited

U.S. PATENT DOCUMENTS

| | | | | |
|---|---|---|---|---|
| 5,371,537 A * | 12/1994 | Bohan | ................ | G01J 1/08 |
| | | | | 348/181 |
| 5,892,585 A * | 4/1999 | Lianza | ................ | G01J 1/44 |
| | | | | 348/E17.004 |
| 6,067,166 A * | 5/2000 | Fox | ................ | G01J 3/02 |
| | | | | 250/226 |
| 6,262,804 B1 * | 7/2001 | Friend | ................ | G01J 3/02 |
| | | | | 235/462.45 |
| 6,459,485 B1 * | 10/2002 | Tsurutani | ................ | G01M 11/00 |
| | | | | 348/180 |
| 6,590,648 B1 * | 7/2003 | von Orelli | ................ | G01J 3/02 |
| | | | | 356/326 |
| 6,611,249 B1 * | 8/2003 | Evanicky | ................ | G01J 3/02 |
| | | | | 345/102 |
| 6,657,712 B2 * | 12/2003 | Yamaguchi | ................ | G01J 1/32 |
| | | | | 348/E17.005 |
| 6,775,633 B2 * | 8/2004 | Edge | ................ | H04N 1/6033 |
| | | | | 348/776 |
| 6,784,995 B2 * | 8/2004 | Merle | ................ | G01J 3/02 |
| | | | | 356/225 |
| 6,880,790 B2 * | 4/2005 | Lutz | ................ | G01N 21/01 |
| | | | | 248/206.3 |
| 6,933,967 B2 * | 8/2005 | Doyle | ................ | G01J 3/46 |
| | | | | 348/189 |
| 7,027,140 B2 * | 4/2006 | Slocum | ................ | H04N 17/04 |
| | | | | 250/226 |
| 7,064,831 B2 * | 6/2006 | Lutz | ................ | G01J 3/46 |
| | | | | 348/191 |
| 7,671,991 B2 * | 3/2010 | Von Orelli | ................ | G01J 3/02 |
| | | | | 356/402 |
| 8,172,196 B2 * | 5/2012 | Danhamer | ................ | G01J 3/02 |
| | | | | 248/682 |
| 8,373,722 B2 * | 2/2013 | Hibi | ................ | G09G 3/3611 |
| | | | | 345/207 |
| 8,405,647 B2 * | 3/2013 | Chifu | ................ | G01J 1/02 |
| | | | | 345/207 |
| 8,467,060 B2 * | 6/2013 | Corley | ................ | G01J 3/506 |
| | | | | 348/180 |
| 8,743,101 B2 * | 6/2014 | Kaji | ................ | G02F 1/13318 |
| | | | | 345/207 |
| 9,041,929 B2 * | 5/2015 | Park | ................ | G01J 3/0202 |
| | | | | 348/189 |
| 2005/0078305 A1 | 4/2005 | Slocum et al. | | |
| 2008/0204437 A1 * | 8/2008 | Jensen | ................ | G01J 1/02 |
| | | | | 345/207 |
| 2008/0250858 A1 * | 10/2008 | Park | ................ | G01J 3/02 |
| | | | | 73/431 |
| 2008/0294298 A1 * | 11/2008 | Park | ................ | G01J 3/02 |
| | | | | 700/302 |
| 2009/0179881 A1 * | 7/2009 | Hibi | ................ | G09G 3/3611 |
| | | | | 345/207 |
| 2010/0090974 A1 * | 4/2010 | Jung | ................ | G06F 3/041 |
| | | | | 345/173 |

FOREIGN PATENT DOCUMENTS

| | | |
|---|---|---|
| KR | 10-2009-0017950 A | 2/2009 |
| KR | 10-2010-0134908 A | 12/2010 |

* cited by examiner

10 - display device
30 - cable
100 - calibrator
120 - absorption plate
150 - middle cover
190 - top cover

Fig. 3

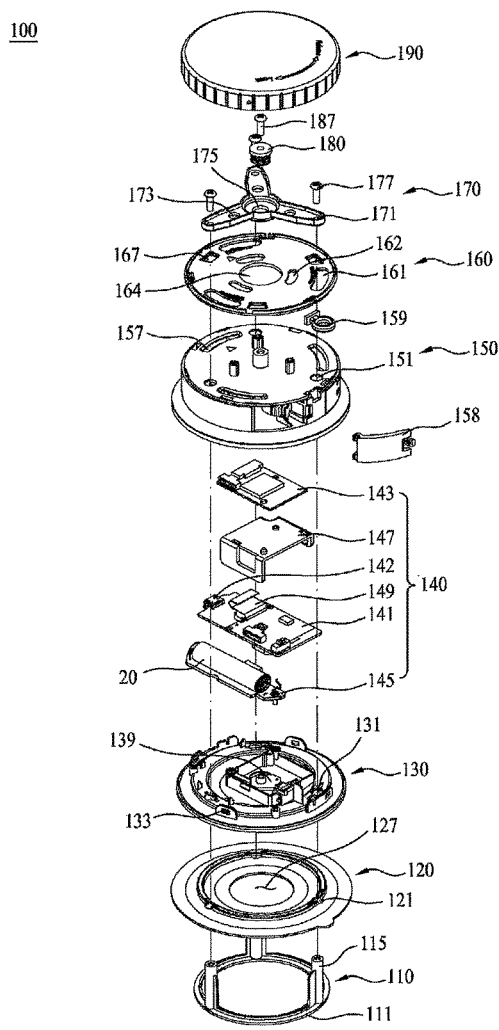

20 - battery
110 - control bracket
111 - control plate
115 - control rods
120 - absorption plate
121 - first rod insertion hole
127 - hole
130 - fixed plate
131 - second rod insertion hole
133 - first coupling portion
139 - light guide
140 - circuit unit
141 - control board
142 - interface
143 - wireless board
147 - shield can
149 - sensor
150 - middle cover
151 - third rod insertion
157 - hooking groove
159 - ring
160 - rotary portion
161, 162, 164 - holes
167 - hook insertion hole
170 - movable frame
171 - control rod insertion hole
173, 175 - insertion holes
177 - screw
180 - flexible member
187 - screw
190 - top cover Fig. 4
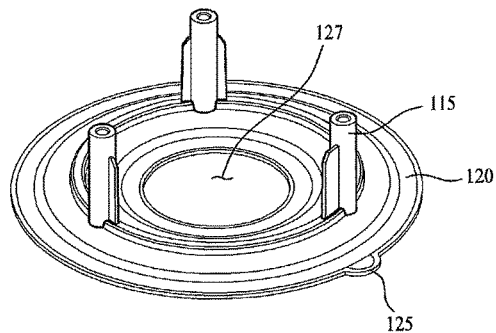
115 - control rods
120 - absorption plate
121 - first rod insertion hole
127 - hole
Fig. 5
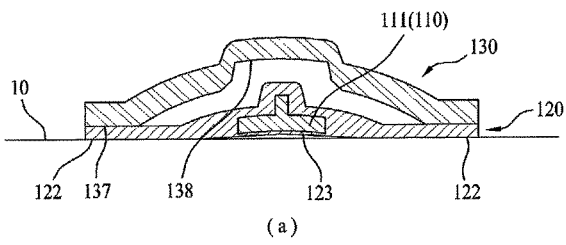
(a)
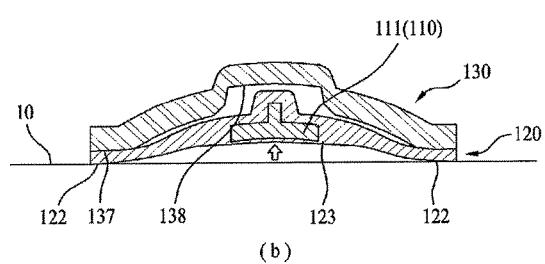
(b)
10 - display device
110/111 - control bracket
120 - absorption plate
122 - second portion
123 - first portion
137 - projected portion
138 - recessed portion 115 - control rods
120 - absorption plate
125 - separation protrusion
133 - first coupling portion
139 - light guide
140 - circuit board
141 - control board
142 - interface
143 - wireless board
145 - power board
147 - shield can 115 - control rods
120 - absorption plate
125 - separation protrusion
145 - power board
153, 155 - guide poles
158 - battery cover
159 - ring 115 - control rods
120 - absorption plate
145 - power board
150 - middle cover
159 - ring
160 - rotary protrusion
161, 162, 164 - holes
163 - inclined portion
165 - first rotary coupling portion
167 - hook insertion hole
170 - movable frame
177 - screw
180 - flexible member
187 - screw 163 - inclined portion
163a, 163c - inclined surfaces
163b, 163d - seating surfaces
170 - movable frame 100 - calibrator
120 - absorption plate
125 - separation protrusion
159 - ring
160 - rotary portion
163 - inclined portion
170 - movable frame
190 - top cover
197 - hook 115 - control rod
120 - absorption plate
125 - separation protrusion
130 - fixed plate
133 - first coupling portion
139 - light guide
141 - control board
147 - shield can
149 - sensor
150 - middle cover
152 - second coupling portion
159 - ring
163 - inclined portion
170 - movable frame
197 - hook 115 - control rods
120 - absorption plate
130 - fixed plate
133 - first coupling portion
139 - light guide
141 - control board
147 - shield can
149 - sensor
150 - middle cover
152 - second coupling portion
153, 155 - guide poles
160 - rotary portion
163 - inclined portion
170 - movable frame
180 - flexible member
187 - screw 200 - calibrator
225 - separation protrusion
250 - middle cover
259 - ring
250 - rotary plate
290 - top cover 200 - calibrator
210 - control bracket
215 - control rod
220 - absorption plate
225 - separation protrusion
230 - fixed plate
231 - rod insertion hole
235 - separation protrusion
240 - circuit unit
241 - control board
242 - interface
250 - middle cover
259 - ring
260 - rotary plate
261 - rotation hole
262 - hole
270 - movable frame
271 - holes
277 - screw
290 - top cover
295 - second rotation coupling portion 215 - control rod
230 - fixed plate
231 - rod insertion hole
235 - separation protrusion
240 - circuit unit
241 - control board
242 - interface 220 - absorption plate
250 - middle cover
251 - rod insertion hole
253 - guide protrusion
254 - groove
255 - protrusion
259 - ring 220 - absorption plate
250 - middle cover
253 - guide protrusion
261 - rotary plate
263 - lateral wall
265 - rotation coupling portion
270 - movable frame
277 - screw 20 - battery
215 - control rods
220 - absorption plate
231 - rod insertion holes
235 - separation protrusion
237 - battery cover
250 - middle cover
253 - guide protrusion
260 - rotary plate
261 - rotary plate
263 - lateral wall
265 - rotation coupling portion
270 - movable frame
277 - screw
290 - top cover

CALIBRATOR FOR A DISPLAY SCREEN

TECHNICAL FIELD

The present invention may relate to a calibrator having a structure that may be attached to a screen of a display device easily.

BACKGROUND ART

Out of display devices, a liquid crystal display has advantages of a small size, a thin volume and low power consumption. Accordingly, such a liquid crystal display has been used for a notebook computer, an office automation device, an audio/video device and so on. Especially, an active matrix liquid crystal display including a thin film transistor (hereinafter, TFT) as a switch device is proper to display a dynamic image.

Brightness and contrast output from a plurality of pixels of the liquid crystal display are set differently for each product and each manufacturer and even the same image output from the liquid crystal display can be realized with a different color sense.

It is necessary to adjust a color sense of a screen in case a user is doing a work of which a color sense realized on a screen is important. In a video wall including a plurality of liquid crystal displays matrix-arranged to realize one screen, the color sense of one liquid crystal display might be different from that of the neighboring liquid crystal display and such a difference of the color senses might deteriorate the unity of the screen. Accordingly, it is necessary to calibrate the difference of the color senses.

A conventional calibrator is in contact with a screen of a display device, with a cable hung on a top of the display device. To use such a method of the conventional calibrator in a large video wall, a long cable has to be used. If the cable is long, it is inconvenient to move the position of the calibrator.

DISCLOSURE OF INVENTION

Technical Problem

To overcome the disadvantages, an object of the present invention is to provide. A calibrator having a mounting structure that can be attached to a screen of a display device easily.

Solution to Problem

To achieve these objects and other advantages and in accordance with the purpose of the embodiments, as embodied and broadly described herein, a calibrator configured to calibrate a color of a screen of a display device includes an absorption plate formed of a transformable material, comprising a bottom surface attached to the screen of the display device in a vacuum absorption method; a control portion configured to leave space a first portion of the absorption plate from the screen of the display device; a fixed portion configured to press a second portion of the absorption plate to the screen to very close to each other; a rotary portion configured to rotatably coupled to the fixed portion in a horizontal direction of the display device and to move the control portion in a vertical direction of the display device, when it is rotated; and a circuit unit mounted in the fixed portion to calibrate the color of the display device.

The control portion may include a control bracket comprising a control plate coupled to a first portion of the absorption plate and a control rod extended from the control plate in a vertical direction; and a movable frame coupled to an end of the control rod to move in a vertical direction of the display device, when the rotary portion is rotated and to leave space the control bracket and the first portion of the absorption plate from the screen of the display device.

The rotary portion may include a rotary plate comprising an inclined portion in contact with a lower portion of the movable frame, and the movable frame may move along the inclined portion when the rotary plate is rotated and move in a vertical direction with respect to the display device.

The inclined portion may include an inclined surface and a seating surface provided in an end of the inclined surface.

The inclined portion may be provided in two steps, and the inclined portion may include a first inclined surface, a first seating surface, a second inclined surface continuously formed after the first seating surface and a second seating surface continuously formed after the second inclined surface.

The inclined portion may be formed by a difference between thicknesses possessed by a bottom surface of the rotary plate.

The rotary plate may further include a rotation hole configured to insert the control rod therein, in an arc shape with respect to a rotation axis of the rotary plate.

The fixed portion may include a fixed plate coupled to a top surface of the absorption plate, the fixed plate including a projected portion having a bottom surface in close contact with a first portion of the absorption plate and a recessed portion spaced apart a predetermined distance from a first portion of the absorption plate.

The fixed plate may further include a first rod insertion hole formed in the recessed portion to penetrate the control rod there through.

The calibrator circuit unit may be seated on a top surface of the fixed plate, and the fixed portion may further include a middle cover coupled to the top surface of the fixed plate to cover the circuit unit, with a second rod insertion hole configured to penetrate the control rod there through.

The calibrator may further include a guide pole formed in a top surface of the middle cover, wherein the rotary plate may include a hole configured to insert the guide pole therein, and the movable frame may further include a guide pole insertion hole configured to insert the guide pole therein.

The calibrator may further include a flexible member coupled to an end of the guide pole to push the movable frame downward.

The guide pole may be provided in an outer position with respect to a rotational center of the rotary plate, and the hole of the rotary plate may be formed in an arc shape with respect to a rotation axis of the rotary plate.

The rotary portion may include a top cover configured to cover the movable frame and coupled to the rotary plate to rotate together with the rotary plate.

The top cover may further include a hook projected downward, with a hooking protrusion formed in an end thereof, and the rotary plate may include a hook insertion hole configured to penetrate the hook there through, and the middle cover may further include a hooking hole formed in an inner surface of the middle cover to hook a hooking protrusion of the hook therein.

The hook may be provided in an outer position with respect to a rotation center of the rotary portion, and the hooking hole may be formed in an arc shape corresponding to the distance where the hook moves by the rotation of the rotary portion.

The top cover may further include a plurality of grooves formed in a circumferential portion thereof.

The absorption plate may be formed in a donut shape having a hole formed in a central portion, and the first portion may be formed in a ring shape provided in a middle portion of the donut shape of the absorption plate, and the second portion may be formed in an inner circumference and an outer circumference of the donut shape of the absorption plate.

Three or more circular absorption plates may be arranged in a circular shape, and the first portion may be a central portion of the absorption plate, and the second portion may be an outer circumferential portion of the absorption plate.

The absorption plate may further include a separation protrusion projected from an end thereof.

The circuit unit may include a control board having a sensor configured to calibrate a color of the screen of the display device mounted therein.

The circuit unit may further include a wireless board configured to transmit and receive data to and from an external terminal or an external system via wireless communication.

Advantageous Effects of Invention

According to at least one of the embodiments described above, the calibrator may be fixed in a precise position of the screen and the screen calibration can be performed precisely. The calibrator can be attached even to a tilted screen and used widely.

Furthermore, it is easy to attach and detach the calibrator according to the embodiments of the present invention to and from the screen such that the efficiency of the calibrator may be enhanced. In addition, the cable may be omitted and the portability of the calibrator is advantageously enhanced.

Additional effects, objects, and features of the invention will be set forth in part in the description which follows and in part will become apparent to those having ordinary skill in the art upon examination of the following or may be learned from practice of the invention. The objectives and other effects of the invention may be realized and attained by the structure particularly pointed out in the written description and claims hereof as well as the appended drawings.

BRIEF DESCRIPTION OF DRAWINGS

FIG. 3 is an exploded perspective diagram illustrating the calibrator according to the embodiment of the present invention;

FIG. 4 is a perspective diagram illustrating a control bracket and an absorption plate coupled each other in the calibrator according to the embodiment of the present invention;

FIG. 5 is a sectional diagram illustrating transformation of the absorption plate shown in FIG. 4;

MODE FOR THE INVENTION

Figure 1:
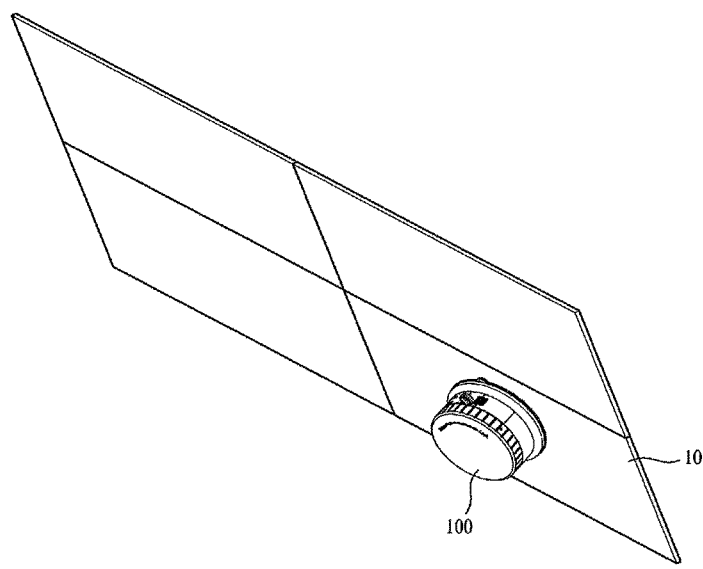
FIG. 1 is a use state diagram illustrating a calibrator according to one embodiment of the present invention that is attached to a display device.

Specific embodiments will be explained in the drawings and the detailed description. However, it is to be understood that the invention is not limited in its application to the details of constriction and the arrangement of components set forth in the following description or illustrated in the following drawings.

It will be understood that when an element is referred to with first and second , the element is not limited by them. They may be used only for a purpose of distinguishing the element from the other elements.

It will be understood that when an element is referred to as being connected or linked another element, it can be directly connected or linked to the element, and one or more intervening elements may also be present. When an element is referred to as being directly connected or directly linked , it will be understood that no intervening elements can present.

The phraseology and terminology used herein are for the purpose of description and should not be regarded as limiting. The use of "including," "comprising," or "having" and variations thereof herein is meant to encompass the items listed thereafter and equivalents thereof as well as additional items. A singular element may encompass plural elements, unless specified or limited otherwise. The use of "including," "comprising," or "having" and variations thereof herein is meant to encompass the characteristics, numbers, steps, operations, elements, component parts or combinations thereof listed thereafter and equivalents thereof as well as additional items, not excluding one or more different characteristics, numbers, steps, operations, elements, component parts or combinations thereof.

A method of calibrating a color of a display device according to embodiments of the present invention will be described in detail, referring to the accompanying drawings. Reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

FIG. 1 is a use state diagram illustrating a calibrator 100 according to one embodiment of the present invention that is attached to a display device 10. A color calibration image pops up on the display device 10 and the calibrator 100 is fixed on the screen of the display device 10 to calibrate the color.

In case the display device 10 is used, with one TV or monitor standing vertically, a cable is connected to the calibrator 100 on the display device 10 easily. In case the calibrator is used in such the display device 10 as a video wall having a plurality of display panels as shown in FIG. 1, the cable cannot but be long disadvantageously.

Especially, when the display device is tilted forwardly as shown in FIG. 1, the method using the conventional cable in attaching the calibrator 100 to the display device cannot be applied.

The calibrator 100 according to the embodiment includes an absorption plate configured to secure the calibrator 100 to the screen of the display 10 directly, such that even the tilted display device 10 can have the color thereof calibrated. A lower portion means a direction of a screen when securing the calibrator 100 to the screen of the display device and an upper portion means the reverse direction.

Figure 2:
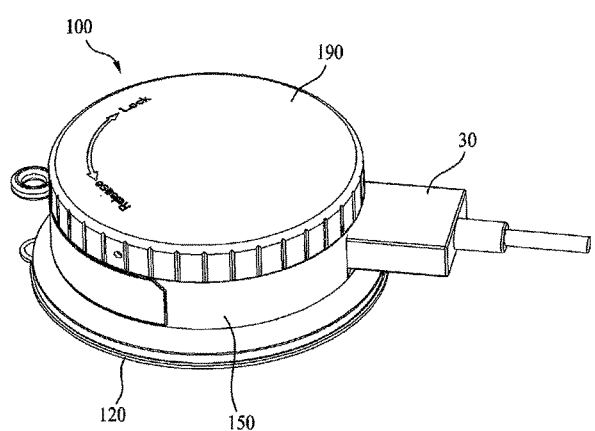
FIG. 2 is a perspective diagram illustrating the calibrator according to the embodiment of the present invention.

FIG. 2 is a perspective diagram illustrating the calibrator 100 according to the embodiment of the present invention. Referring to FIG. 2, the calibrator 100 according to the embodiment includes an absorption plate 120 of which a shape is changed to form a vacuum space between the screen of the display device 10 and the absorption plate 120. Accordingly, the calibrator 100 may be secured to the display device 10 in a vacuum absorption method.

At this time, when a user pressing a conventional absorption plate 120 to attach the calibrator 100 to the display device 10, the screen of the display device 10 could be pressed enough to change the color of the screen. However, when a rotary unit 190 is rotated, a vacuum state is formed between the absorption plate 120 provided in the calibrator 100 according to this embodiment and the display device 10, such that the calibrator may be attached to the display device 10.

As shown in FIG. 2, the calibrator 100 may transmit and receive data from an external system or a terminal via a cable 30. According to the embodiment, the calibrator 100 may transmit and receive data wirelessly.

FIG. 3 is an exploded perspective diagram illustrating the calibrator 100 according to the embodiment of the present invention. Referring to FIG. 3, the calibrator 100 may include a control bracket 110, an absorption plate 120, a fixed plate 130, a circuit unit 140, a middle cover 150, a rotary plate 160, a movable frame 170, a flexible member 180 and a top cover 190.

The absorption plate 120 attached to the display device 10 may include a fixed portions 130 and 150 fixedly provided to make a predetermined portion of the absorption plate 120 closely contact with the display device, rotary portions 160 and 190 rotatable in a horizontal direction with respect to the screen of the display device 10, and controlling portions 110 and 170 movable in a vertical direction along the rotation of the rotary portions 160 and 190 to change the shape of the absorption plate 120.

The fixed plate 130, the circuit unit 140 and the middle cover 150 are corresponding to the fixed portions that are not movable. The rotary plate 160 and the top cover 190 are corresponding to the rotary portions rotatable in a horizontal direction with respect to the screen of the display device 10. The control bracket 110 and the movable frame 170 are corresponding to the control portions that are movable in a vertical direction along the rotation of the rotary portions.

FIGS. 4 to 10 show that the elements of FIG. 3 are coupled o each other. FIG. 4 is a perspective diagram illustrating the control bracket 110 and the absorption plate 120 coupled to each other in the calibrator 100 according to the embodiment of the present invention.

The absorption plate 120 is formed of a transformable material such as rubber and silicon. A first portion of the absorption plate 120 is spaced apart a predetermined distance from the display device 10 and a second portion thereof is in close contact with the display device 10 to form the vacuum state. In the vacuum state, the pressure is relatively low and an atmospheric pressure presses the absorption plate 120, only not to separate the absorption plate from the display device 10.

The absorption plate 120 according to this embodiment is donut-shaped, with a hole 127 formed in a central portion thereof. A sensor 149 is arranged in the hole to calibrate the color of the display device 10, facing the screen of the display device 10. The hole 127 is formed in the central portion of the absorption plate 120 and the sensor 149 is exposed to the bottom via the hole.

To make the donut-shaped absorption plate 120 vacuum, a first portion of the absorption plate 120 is a central portion of the donut shape and formed in a ring shape. A second portion is an inner edge portion and an outer edge portion of the first portion in the absorption plate.

The control bracket 110 is corresponding to the control portion and it makes the first portion of the absorption plate 120 distant from the screen of the display device. The control bracket 110 includes a control plate 111 formed in a ring shape corresponding to the shape of the first portion and a control rod 115 projected upward from the control plate 111.

FIG. 5 is a sectional diagram illustrating the transformation of the absorption plate 120 shown in FIG. 4. The control bracket 110 and the absorption plate 120 may be integrally formed with each other, such that the control plate 111 may be positioned in the absorption plate 120 and that only the control rod 115 may be projected upward from the absorption plate via a first rod insertion hole 121. It is preferred that the control bracket 110 is integrally firmed with the absorption plate 120 for a bottom surface of the absorption plate 120 not to form a gap.

FIG. 5 (a) is a diagram illustrating a state before the calibrator is attached to the screen of the display device 10 and (b) is a diagram illustrating a state where the first portion is lifted by the control bracket 110 to make the first portion 123 distant from the screen of the display device 10, when the calibrator is attached to the screen of the display device 10. After that, the space between the absorption plate 120 and the display device 10 may be made vacuum as shown in FIG. 5 (b) and then the calibrator 100 may be secured to the display device.

At this time, the fixed plate 130 presses the second portion 122 of the absorption plate 120 not to be lifted together with the first portion. A bottom surface of the fixed plate 130 seated on a top surface of the absorption plate presses the first portion 122 and provides a space where the first portion 123 can move vertically. In other words, a projected portion 137 may be formed in a position corresponding to the second portion of the absorption plate 120 and a recessed portion 138 may be formed in a position corresponding to the first portion.

The control rod 115 shown in FIG. 4 is a member configured to transfer the force lifting the control plate 111 of the control bracket 110 upward. In the drawing, three control rods 115 are shown and more than three control rods 115 may be formed. If the number of the control rods 115 increases, a stronger force can be transmitted to the control bracket 110 but the size of the calibrator 100 might increase disadvantageously. Because of that, a proper number of control rods may be provided.

As shown in FIG. 3, an end of the control rod is projected to a top surface of the absorption plate 120, penetrating the fixed plate, the middle cover 150 and the rotary plate 160, such that the end may be coupled to the movable frame 170. The vertical movement of the movable frame 170 is transferred to the control plate 111 and the first portion 123 of the absorption plate 120 through the control rod 115, such that vacuum absorption can be performed. Detailed description thereof will be described later.

Figure 6:
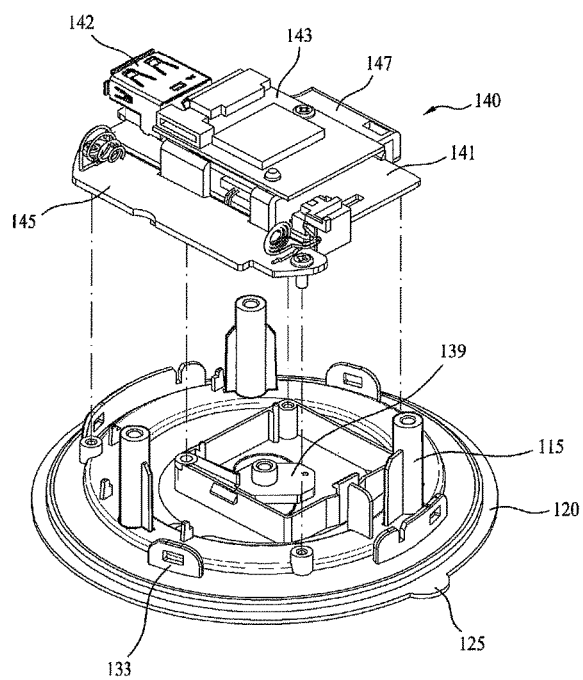
FIG. 6 is a perspective diagram illustrating a fixed plate coupled in a state of FIG. 4 and a circuit unit.

FIG. 6 is a perspective diagram illustrating the fixed plate 130 coupled to the state shown in FIG. 4 and the circuit unit 140. The circuit unit 140 is mounted on a top surface of the fixed plate 130 and at the same time, the fixed plate 130 presses the second portion of the absorption plate 120 closely.

The fixed plate 130 may include a second rod insertion hole 131 configured to penetrate the control rod 115 there through and a first coupling portion 133 configured to fixedly couple a middle cover 150 thereto, which will be described later. The fixed plate 130 may further include a light guide 139 configured to guide light toward a sensor 149 seated in a central portion thereof.

The circuit board 140 mounted on the top surface of the fixed plate 130 includes a control board 141, a shield can 147, a wireless board 143 and a power board 145.

The sensor 149 is mounted on the control board 141 to sense the light emitted from the screen of the display device to calibrate colors and the control board 141 processes the information collected in the sensor 149. The control board 141 may further include an interface 142 connected to a cable to transmit data to an external device.

The control board 141 may further include a wireless board 143 to transfer data wirelessly. An antenna pattern is formed in the wireless board 143 to communicate with an external terminal or an external system wirelessly and the wireless board 143 is connected with the control board 141 to transmit and receive data.

The shield can 147 is installed in an upper surface of the control board 141 to form a mounting surface where the wireless board 143 is mounted, only to prevent the circuit board from getting wide in a lateral direction. The shield can 147 may be arranged in two steps. The power board 145 is configured to transfer the power from the battery 20 to the control board 141 and the wireless board 143.

Figure 7:
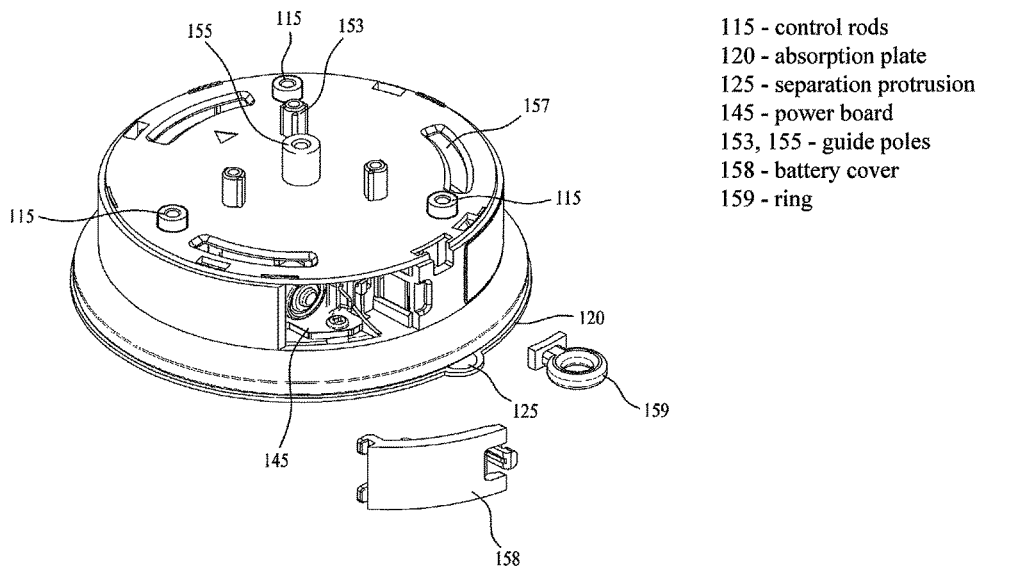
FIG. 7 is a perspective diagram illustrating a middle cover coupled in a state of FIG. 6.

FIG. 7 is a perspective diagram illustrating the middle cover 150 coupled to the state shown in FIG. 6. The middle cover 150 composes the fixed portion together with the fixed plate 130 and it is not rotated when the rotary portions 160 and 190 are rotated. The middle cover 150 covers and protects the circuit board 140 from being exposed outside. In addition, a top surface of the middle cover 150 provides a mounting surface where the rotary plate 160 and the movable frame 170 can be mounted.

The middle cover 150 may further include a second coupling portion 152 formed therein. The second coupling portion is coupled to the first coupling portion 133 to fixedly couple the fixed plate 130 and the middle cover 150 to each other (see FIG. 11).

A hole is formed in the middle cover 150 to insert the battery 20 therein through a lateral surface of the middle cover 150 and a battery cover 158 may open and close the hole to cover the battery. In the conventional calibrator, the absorption plate 120 is not provided in a bottom surface and the battery 20 is inserted in the calibrator through the bottom surface. However, in the calibrator 100 according to the present invention, the size of the bottom surface is not increased to insert the battery 20 there through but the battery 20 may be inserted through the lateral surface of the calibrator. Alternatively, a ring 159 may be attached to the middle cover 150 to be connected to a strap.

Figure 10:
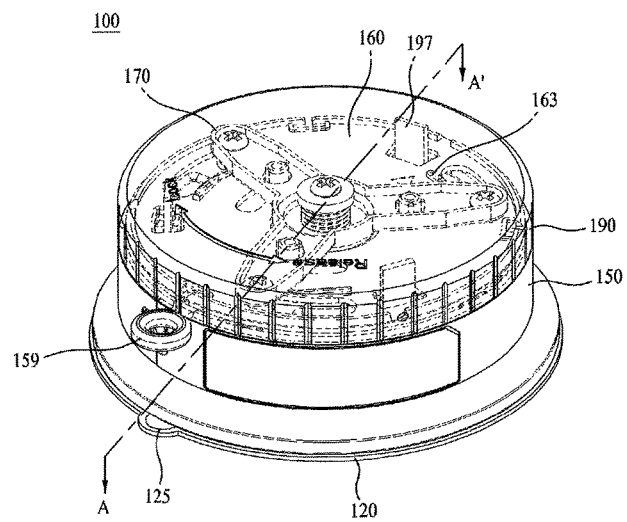
FIG. 10 is a perspective diagram illustrating a top cover coupled in a state of FIG. 8.

The third rod insertion hole 151 is formed in the top surface of the middle cover 150 and the control rod 115 is projected to the top surface of the middle cover 150 through the third rod insertion hole 151. An arc-shaped hooking groove 157 may be formed in the top surface of the middle cover 150. As shown in FIG. 10, a hook 197 projected downward with respect to a top cover, which will be described later, may be hooked to the hooking groove 157 and the hook 197 may be rotated along the hooking groove 157. The hook 197 and the hooking groove 157 may prevent a gap formed between the top cover 190 and the middle cover 150, when the rotary portions 160 and 190 are rotated.

A plurality of guide poles 153 and 155 may be projected from the top surface of the middle cover 150. The guide poles 153 and 155 penetrates the rotary plate 160 coupled on the middle cover 150 and the movable frame 170. The guide poles 153 and 155 guides the rotary plate 160 rotating on the top surface of the middle cover 150, without separating from the top surface.

Guide grooves 162 and 164 are formed in the rotary plate 160 to penetrate the guide poles 153 and 155 there through (see FIG. 3). The shape of the guide grooves 162 and 164 may be variable based on the positions of the guide poles 153 and 155. Specifically, when the guide poles 153 and 155 are formed in a central portion of the rotary plate 160 as shown in FIG. 3, a circular hole 164 and an arc-shaped hole 162 may be formed and the guide poles 153 and 155 formed in an outer portion from the central portion may penetrate the arc-shaped hole 162.

Figure 8:
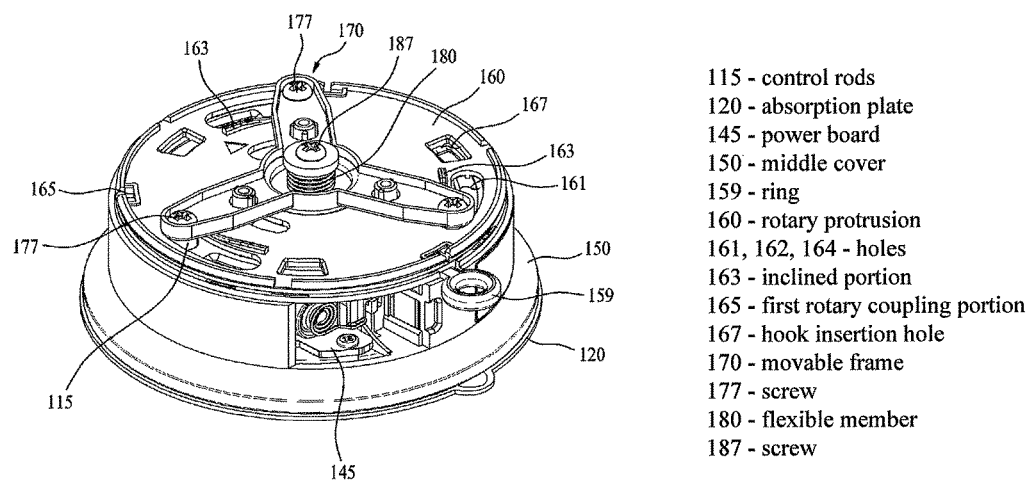
FIG. 8 is a perspective diagram illustrating a rotary plate and a movable frame that are coupled in a state of FIG. 7.

FIG. 8 is a perspective diagram illustrating the rotary plate 160 and the movable frame 170 that are coupled to the state shown in FIG. 7. The rotary plate 160 is rotated on the top surface of the middle cover 150 and the movable frame 170 is moving vertically along the rotation of the rotary plate 160.

The rotary plate 160 is seated on the top surface of the middle cover 150 and a plurality of holes 161, 162 and 164 are formed in the rotary plate 160 to penetrate the guide poles 153 and 155 formed in the top surface of the middle cover 150 and the control rod 115 there through.

Figure 9:
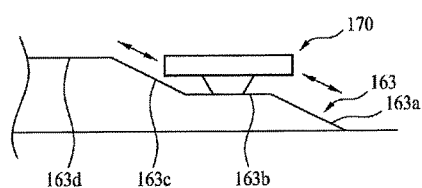
FIG. 9 is a perspective diagram illustrating an inclined portion of the calibrator according to the embodiment of the present invention.

An inclined portion 163 may be formed in a top surface of the rotary plate 160, in contact with a bottom surface of the movable frame 170. The movable frame 170 moves along the inclined portion 163 vertically, when the rotary plate 160 is rotated, and then the distance between the movable frame 170 and the rotary plate 160 is changing. FIG. 9 is a perspective diagram illustrating the inclined portion 163 of the calibrator 100 according to the embodiment of the present invention.

As shown in FIG. 9, the inclined portion 163 may include inclined surfaces 163a and 163c and seating surfaces 163b and 163d. When the movable frame 170 is moving upward along the inclined surfaces 163a and 163c, the control rod 115 is lifted up and the absorption plate 120 is in a state shown in FIG. 5 (b). The seating surfaces 163b and 163d provide flat surfaces to keep the lifted state of the absorption plate 120 from sliding down from the inclined surfaces 163*a* and 163*c*.

As shown in FIG. 9, the inclined portion 163 may be two-stepped, with a first inclined surface 163 and a first seating surface 163*b* and continuously a second inclined surface 163*c* and a second seating surface 163*d*. A stronger absorptive adhesion could be required according to the tilted angle of the display device 10. Accordingly, the two-stepped structure can realize a two-stepped absorptive adhesion of the absorption plate 120.

One hole (a rotation hole 161) configured to insert the control rod 115 therein out of the holes 161, 162 and 164 formed in the rotary plate 160 may be formed corresponding to a relative movement with respect to the control rod 115. In other words, the rotary plate 160 may be rotatable as far as the distance corresponding to the length of the rotation hole 161.

Another hole (a first guide groove 162) is formed in a predetermined position to insert therein the first guide pole 153 positioned in an external portion with respect to a rotation axis of the rotary plate 160. The relative positions of the first guide pole 153 and the rotary plate 160 may be variable based on the rotation of the rotary plate 160, such that the first guide groove 162 may be formed in an arc shape.

The second guide pole 155 is positioned in a central portion of the rotary plate 160 and it is a rotation center of the rotary plate 160. Also, the second guide pole 155 is not relatively moving with respect to the rotary plate 160, such that the other hole (a second guide groove 164) configured to insert the second guide pole 155 therein may be formed in a circular shape as shown in FIG. 3. Alternatively, a relatively large hole may be formed in the rotary plate 160 to insert both of the first and second guide poles 153 and 155 therein simultaneously.

A hook insertion hole 167 is configured to insert the hook 197 therein so as to couple the hook projected from the top cover 190 to the middle cover 150. The rotary plate 160 is rotating together with the top cover 190 such that the size of the hook insertion hole 167 may be corresponding to that of the hook 197.

The movable frame 170 includes an insertion holes 171, 173 and 175 to insert the guide poles 153 and 155 and the control rod 115 therein. A screw 177 is coupled to the control rod 115 through a control rod insertion hole 171. Accordingly, the movable frame 170 may move vertically along the inclined portion 163 when the rotary plate 160 is rotated.

The movable frame 170 is insertedly coupled to the guide poles 153 and 155, not coupled by a screw. When the movable frame 170 is moved in a vertical direction, the guide poles 153 and 155 may be inserted and withdrawn in a vertical direction with respect to the insertion holes 173 and 175. In other words, the guide poles 153 and 155 are not coupled to the movable frame 170 and they guide the vertical movement of the movable frame 170, preventing a horizontal movement, when the movable frame 170 moves in a vertical direction.

The first guide pole 153 is inserted in the first guide groove 162 formed in the arc-shape, to guide the rotational movement of the rotary plate 160.

A flexible member 180 may be coupled to an end of the guide pole 153 and 155. The flexible member 180 may be a spring capable of applying a tension and it may apply a force to the movable plate 170 in a downward direction to make the control rod 115 return to an original state, when the movable plate 170 is moved downward along the inclined portion 163. As shown in FIG. 8, the flexible member may be coupled to the second guide pole 155 formed in the central portion and apply the force to the movable plate 170 in a downward direction. Although not shown in the drawings, the flexible member 180 may be coupled to an end of the first guide pole 153. A screw 187 is coupled to the middle cover via the insertion hole 175.

FIG. 10 is a perspective diagram illustrating the top cover 190 to the state shown in FIG. 8. A first rotary coupling portion 165 formed in the rotary plate 160 is coupled to a second rotary coupling portion 195 formed in the top cover 190, such that the rotary plate 160 may be coupled to the top cover 190.

The top cover 190 is coupled to the middle cover 150 not to expose the movable frame 160 outside. Simultaneously, the user can hold the top cover 190 to rotate the rotary plate 160 easily. To increase a friction force of the portion held by the user, a groove may be formed in an outer portion of the top cover 190.

Referring to FIG. 10, it is shown that the hook 197 projected from the inside of the top cover 190 in a downward direction is extended downward through the hook insertion hole 167 of the rotary plate 160. In a sectional diagram of FIG. 11, a hooking protrusion formed in the end of the hook 197 penetrates the hook coupling groove 157 of the middle cover 150 to be hooked to an inner surface of the middle cover 150. As mentioned above, the middle cover 150 is not moving when the top cover 190 is rotated. Accordingly, the hook 197 moves along the hook coupling groove 157 formed in an arc shape.

Figure 11:
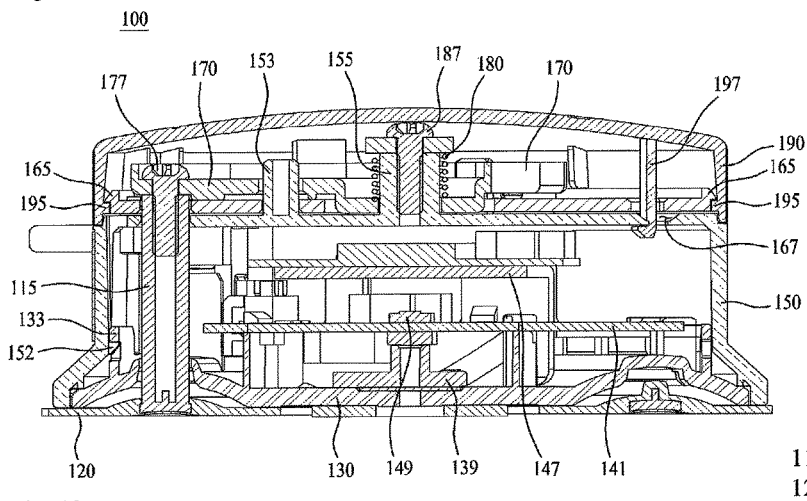
FIG. 11 is a sectional diagram of A-A' shown in FIG. 10.
Figure 12:
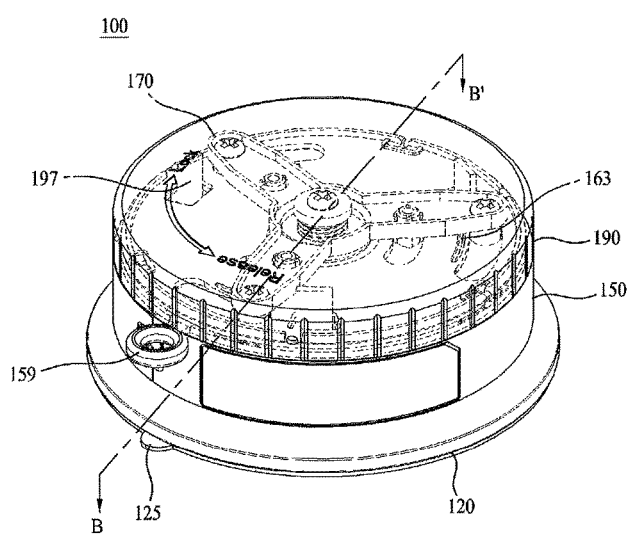
FIG. 12 is a perspective diagram illustrating a state where the calibrator according to the embodiment of the present invention is attached to a display device.
Figure 13:
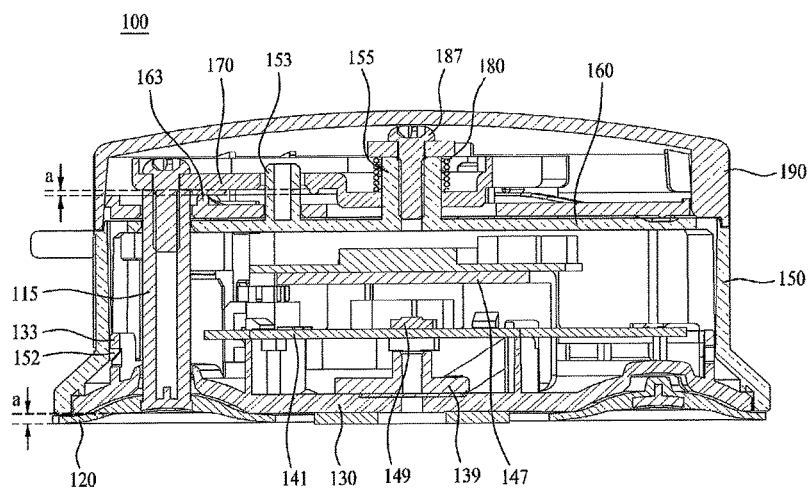
FIG. 13 is a sectional diagram of B-B' shown in FIG. 12.

Referring to FIGS. 10 to 13, the mechanism of the calibrator 100 according to the embodiment attached to the display device will be described in detail as follows. FIG. 10 is a perspective diagram illustrating a top cover coupled in a state of FIG. 8 and FIG. 11 is a sectional diagram of A-A shown in FIG. 10. FIG. 12 is a perspective diagram illustrating a state where the calibrator according to the embodiment of the present invention is attached to a display device and FIG. 13 is a sectional diagram of B-B shown in FIG. 12.

Referring to FIG. 10, the movable frame 170 is in a state where it is not moving upward along the inclined portion 163, in other words, it is positioned in the lowest position of the inclined portion 163, before the calibrator 100 is attached to the display device 10. At this time, the absorption plate 120 is adjacent to the display device 10 as shown in FIG. 11.

When the user attaches the calibrator 100 according to the embodiment to the display device 10 and rotates the top cover 190 to rotate the rotary plate 160 (in a clockwise direction in the drawing), the movable frame 170 is positioned in the highest position of the inclined portion 163 and it means that the movable frame 170 moves as far as the height (a) of the inclined portion 163 in a vertical direction as shown in FIG. 12.

When the movable frame 170 is moved in a vertical direction, the force is transmitted along the control rod 115 to move the control bracket 110 upward as shown in FIG. 13. Together with that, the first portion 123 of the absorption plate 120 is limited as high as (a) to perform the vacuum absorption.

When separating the calibrator 100 from the display device 10, the user rotates the top cover 190 in the reverse direction to release the vacuum absorption state or injects air into the vacuum portion formed in the absorption plate 120, with holding a separation protrusion 125 formed in a predetermined portion of the absorption plate 120.

Referring to FIGS. 14 to 22, a calibrator 200 according to another embodiment of the present invention will be described as follows. The repeated description of this embodiment will be omitted in comparison with the description of the embodiment mentioned above and different features of this embodiment will be described.

Figure 14:
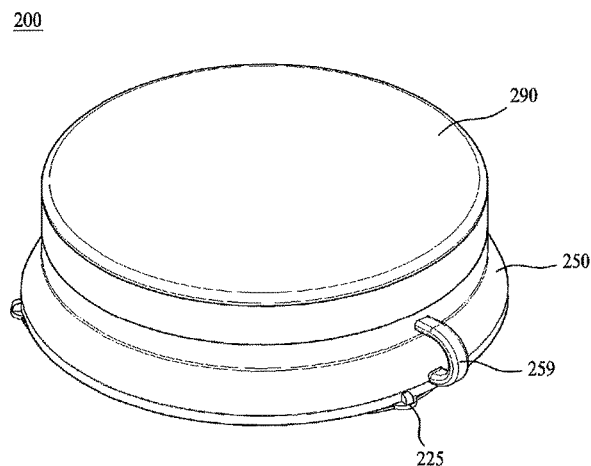
FIG. 14 is a perspective diagram illustrating a calibrator according to another embodiment of the present invention.

FIG. 14 is a perspective diagram illustrating a calibrator 200 according to this embodiment of the present invention. In this embodiment, the calibrator 200 includes a circular absorption having no hole formed in a central portion which is different from the absorption plate of the above embodiment. Three circular absorption plates 220 are arranged in a circular shape and the entire structure of the absorption plate according to this embodiment is simpler than the structure of the embodiment mentioned above.

Figure 15:
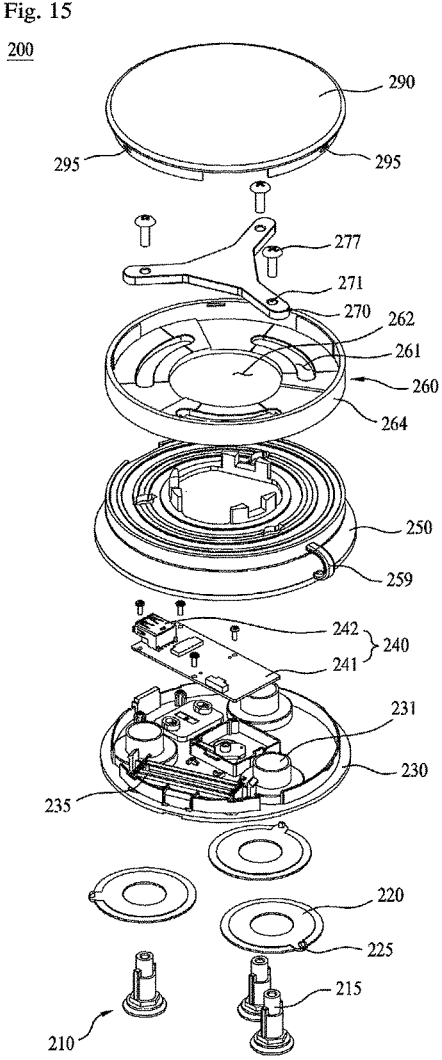
FIG. 15 is an exploded perspective diagram illustrating the calibrator according to the embodiment of FIG. 14.

FIG. 15 is an exploded perspective diagram illustrating the calibrator 200 according to this embodiment. Referring to FIG. 15, the calibrator 200 includes a control bracket 210, an absorption plate 220, a fixed plate 230, a circuit unit 240, a middle cover 250, a rotary plate 260, a movable frame 270 and a top cover 290.

A plurality of absorption plates 220 formed in a circular shape may be arranged to provide a predetermined space where a sensor can be positioned. Each of the absorption plate 220 may be formed in a rectangular shape rather than the circular shape. However, the circular shape preferred to apply a force to ends of the absorption plates 220 uniformly.

A control bracket 210 is coupled to each of the circular shaped absorption plates 220. In this embodiment, the control bracket 210 includes a control plate 111 provided in a central portion of the absorption plate 220 and a control rod 215 extended upward from the control plate 111 through the top surface of the absorption plate 220. Similar to the control rod 215 is coupled to the movable frame 270 through the fixing plate 230, the middle cover 250 and the rotary plate 260 sequentially.

Figure 16:
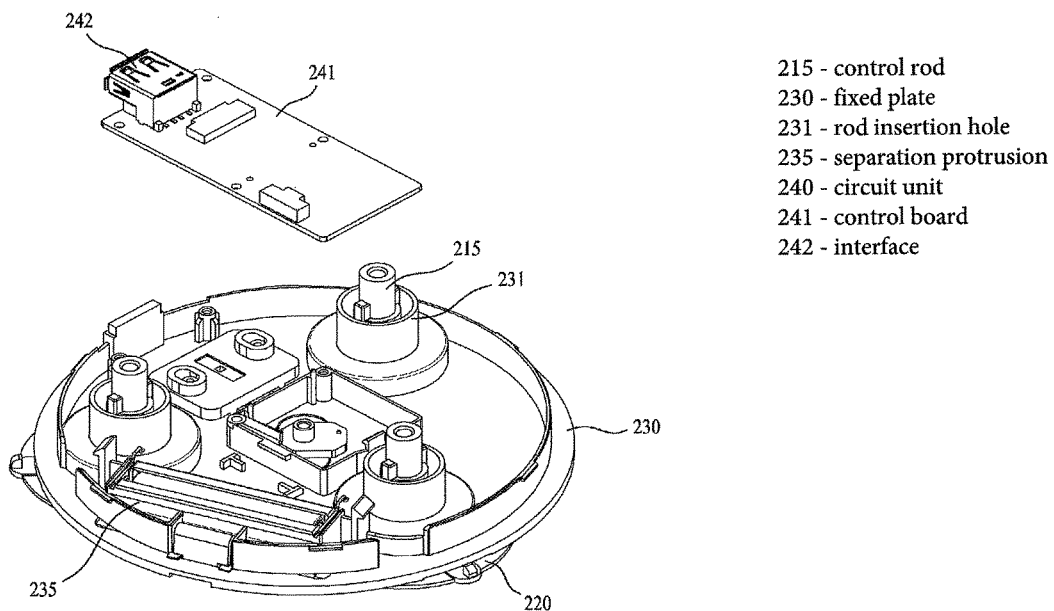
FIG. 16 is a perspective diagram illustrating a fixed plate that is coupled on a control bracket and an absorption plate of the calibrator according to the embodiment of FIG. 14.

FIG. 16 is a perspective diagram illustrating the fixed plate 230 coupled on the control bracket 210 and the absorption plate 220 in the calibrator 200 according to this embodiment. The fixed plate 230 having three rod insertion holes 231 formed in positions corresponding to three control rods 215 is seated on a top surface of the absorption plate 220.

The circuit unit 240 including a control board 241 is seated on a top surface of the fixed plate 230 and comprises an interface 242. In this embodiment, a wireless board is not shown and the wireless board may be further provided, similar to the embodiment mentioned above. In this embodiment, a predetermined space may be formed in the fixed plate 230, without attaching the power board described above, and the battery 20 may be inserted in the space.

Figure 20:
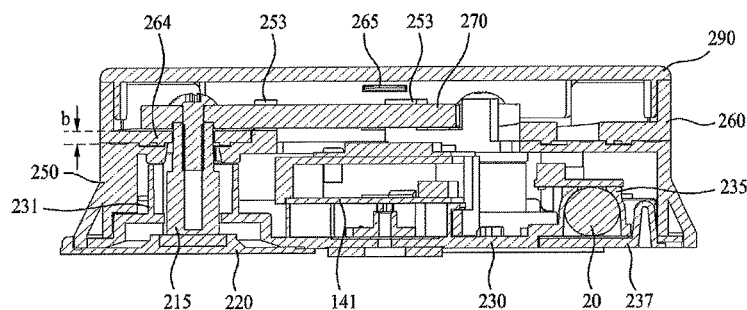
FIG. 20 is a sectional diagram of C-C' shown in FIG. 19.

Compared with the embodiment mentioned above, a bottom surface of the fixed plate 230 has a larger exposed area and the battery 20 may be inserted through the bottom surface (see FIG. 20). A hole for inserting the battery therein may be open and closed by a battery cover 237.

Figure 17:
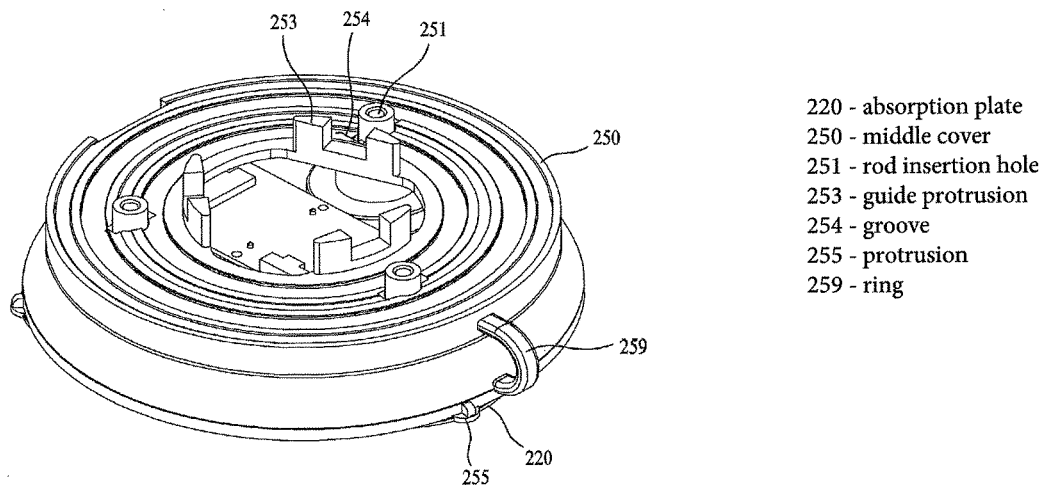
FIG. 17 is a perspective diagram illustrating a middle cover coupled in a state of FIG. 16.

FIG. 17 is a perspective diagram illustrating the middle cover 250 to the state shown in FIG. 16. The middle cover 250 and the fixed plate 230 are coupled to each other, only to form fixed portions.

A rod insertion hole 251 is formed in a top surface of the middle cover 250 to insertedly pass the control rod 215 there through such that the control rod 215 is exposed outside through the rod insertion hole 251. The middle cover 250 according to this embodiment includes a guide protrusion 253, instead of the guide poles 153 and 155 in the above embodiment. A groove 254 is formed in the guide protrusion 253 to insert the movable frame 270 therein so as to guide vertical movement of the movable frame 270. In other words, the movable frame 270 can be moved in the vertical direction by the guide protrusion 253 projected from each of both sides of the groove 254, without shaking in a horizontal direction. The middle cover 250 further comprises a protrusion 255 and a ring 259.

Figure 18:
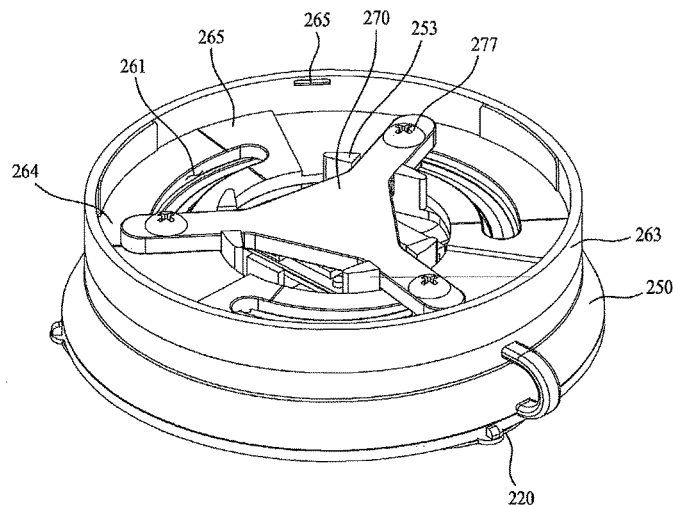
FIG. 18 is a perspective diagram illustrating a rotary unit and an absorption plate position adjusting unit that are coupled in a state of FIG. 17.

FIG. 18 is a perspective diagram illustrating the rotary plate 260 and the movable frame 270 that are coupled to the state shown in FIG. 17. A predetermined portion of the rotary plate 260, corresponding to a lateral surface of the top cover 290 according to the above embodiment, may be formed in an outer surface as a lateral wall 263. The top cover 290 and the rotary plate 260 are coupled to each other and rotated together integrally, such that it may amount to nothing which of the top cover 290 and the rotary plate 260 the lateral wall 263 is extended.

Different from the embodiment mentioned above, an inclined portion formed in a top surface of the rotary plate 260 may be formed in an entire area of the top surface of the rotary plate. In the embodiment mentioned above, the inclined portion 163 is formed in parallel with the rotation hole 161 having the control rod 115 inserted therein (see FIG. 8). However, in this embodiment, a bottom surface of the rotary plate 260 where a rotation hole 261 is formed has a variable thickness along the rotation hole 261 as shown in FIG. 20, only to form an inclined surface. Similar to the embodiment mentioned above, the inclined portion may further include a seating surface even in this embodiment and it may be formed in two steps. In addition, the rotary plate further comprises a hole 262.

The movable frame 270 has wings projected toward the control rods 215, respectively, and each of the wings is inserted in the groove 254 of the guide protrusion 253. Also, an end of the movable frame 270 is coupled to the control rod 215 by a screw 277. The movable frame 270 further comprises holes 271.

Figure 19:
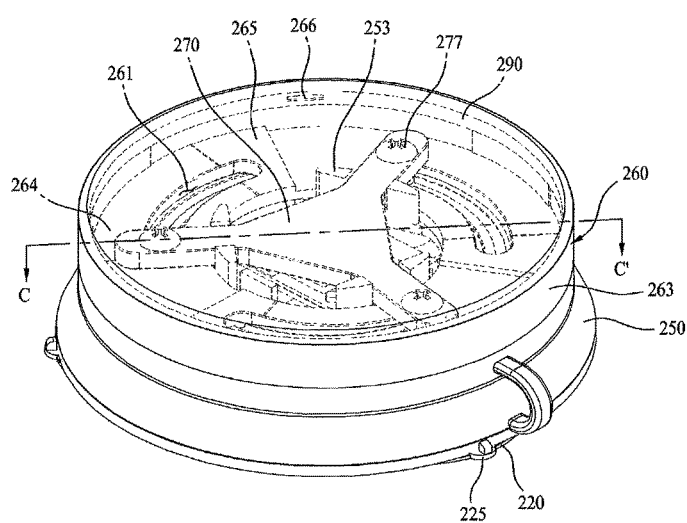
FIG. 19 is a perspective diagram illustrating a top cover coupled in a state of FIG. 18.

FIG. 19 is a perspective diagram illustrating the top cover 290 coupled to the state shown in FIG. 20. The top cover 290 may not include the lateral wall 263 and it may not provide a function of allowing the user to hold, like the top cover 190 mentioned above. However, the top cover 290 may prevent the movable frame 270 from being exposed outside.

Referring to FIG. 20 illustrating a sectional diagram of this embodiment, a first rotation coupling portion 265 formed in the lateral wall 263 of the rotary plate 260 is coupled to a second rotation coupling portion 295 (see FIG. 15) formed in the top cover 290, such that the top cover 290 may be coupled to the rotary plate 260.

Referring to FIGS. 19 to 22, a mechanism of attaching the calibrator 200 according to this embodiment to the display device 10 will be described as follows.

Figure 21:
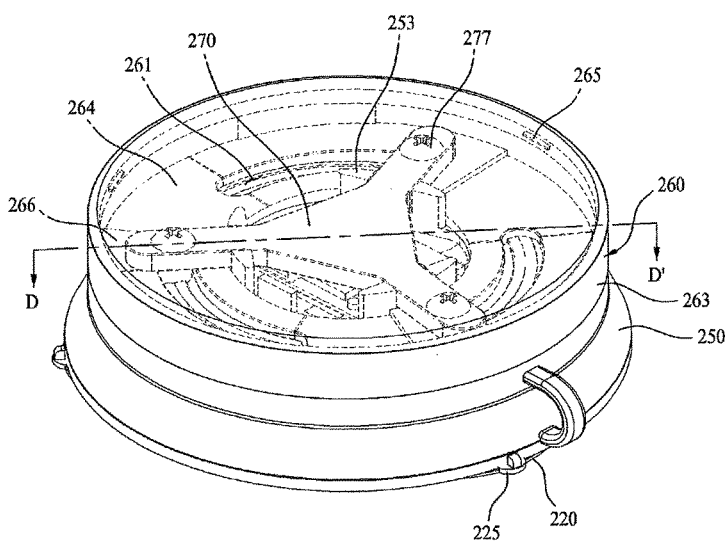
FIG. 21 is a perspective diagram illustrating a state where the calibrator according to the embodiment of FIG. 14 is attached to a screen of a display device.

FIG. 19 is a perspective diagram illustrating a state before the calibrator 200 according to the embodiment is attached to the screen of the display device 10. FIG. 20 is a sectional diagram of C-C shown in FIG. 19. FIG. 21 is a perspective diagram illustrating a state after the calibrator 200 according to the embodiment of FIG. 14 is attached to the screen of the display device 10 and FIG. 22 is a sectional diagram of D-D shown in FIG. 21.

Referring to FIG. 19, the movable frame 270 is in a state where the movable frame 270 is not moved upward along the inclined portion, in other words before the calibrator 200 is attached to the display device 10, in other words, the movable frame 270 is positioned in the thinnest position of the rotary plate 260. At this time, the absorption plate 220 is adjacent to the display device 10 as shown in FIG. 20.

When the user attaches the calibrator 200 according to this embodiment to the display device 10 and rotates the rotary portions 260 and 190, the movable frame 270 is positioned in the highest position of the inclined portion, in other words, in the thickest position of the rotary plate 260 only to move in a vertical direction.

Figure 22:
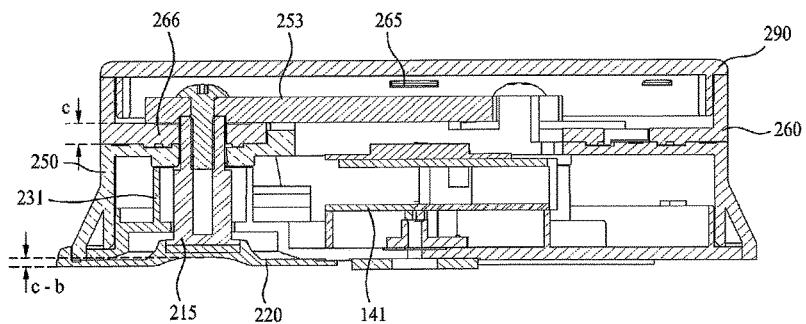
FIG. 22 is a sectional diagram of D-D' shown in FIG. 21.

The movable frame 270 is moved vertically as far as a difference between the thickness (c) of the thickest portion possessed by the rotary plate 260 and the thickness (b) of the thinnest portion possessed by the rotary plate 260 shown in FIG. 22, such that the control rod 215 is moved upwardly according to the vertical movement of the movable frame 270. Also, a first portion of the absorption plate 220 is lifted as high as c-b and vacuum absorption is performed.

When separating the calibrator 200 from the display device 10, the user rotates the top cover 290 in the reverse direction and releases the vacuum absorption or the user holds a separation protrusion 235 formed in the absorption plate 220 and injects air into the vacuum portion formed in the absorption plate 220.

According to at least one of the embodiments described above, the calibrator may be fixed in a precise position of the screen and the screen calibration can be performed precisely. The calibrator can be attached even to a tilted screen and used widely.

Furthermore, it is easy to attach and detach the calibrator according to the embodiments of the present invention to and from the screen such that the efficiency of the calibrator may be enhanced. In addition, the cable may be omitted and the portability of the calibrator is advantageously enhanced.

When a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A calibrator selectively attaching to a screen of a display device for calibrating, comprising:
   an absorption plate formed of a transformable material, comprising a bottom surface attached to the screen of the display device in a vacuum absorption method;
   a control portion pulling a first portion of the absorption plate to leave a space between the first portion of the absorption plate and the screen of the display device, wherein the control portion comprises:
      a control bracket comprising a control plate coupled to the first portion of the absorption plate and a control rod extending from the control plate in a vertical direction; and
      a movable frame coupled to an end of the control rod to move in a vertical direction of the display device, when the rotary portion is rotated, and to space the control bracket and the first portion of the absorption plate from the screen of the display device;
   a fixed portion pressing a second portion of the absorption plate to the screen, wherein the fixed portion comprises:
      a fixed plate coupled to a top surface of the absorption plate, the fixed plate comprising a projected portion having a bottom surface in contact with the second portion of the absorption plate and a recessed portion spaced apart a predetermined distance from a first portion of the absorption plate;
   a rotary portion rotatably coupled to the fixed portion in a horizontal direction of the display device to move the control portion in a vertical direction of the display device, when it is rotated, wherein the rotary portion comprises:
      a rotary plate comprising an inclined portion in contact with a lower portion of the movable frame, and the movable frame moves along the inclined portion when the rotary plate is rotated and moves in a vertical direction with respect to the display device; and
   a circuit unit mounted in the fixed portion to calibrate the color of the display device.

2. The calibrator according to claim 1, wherein the inclined portion comprises an inclined surface and a seating surface provided in an end of the inclined surface.

3. The calibrator according to claim 2, wherein the inclined portion is provided in two steps, and
   the inclined portion comprises a first inclined surface, a first seating surface, a second inclined surface continuously formed after the first seating surface and a second seating surface continuously formed after the second inclined surface.

4. The calibrator according to claim 1, wherein the rotary plate further comprises,
   a rotation hole configured to insert the control rod therein, in an arc shape with respect to a rotation axis of the rotary plate.

5. The calibrator according to claim 1, wherein the fixed plate further comprises,
   a first rod insertion hole formed in the recessed portion to penetrate the control rod there through.

6. The calibrator according to claim 5, wherein the circuit unit is seated on a top surface of the fixed plate, and
   the fixed portion further comprises a middle cover coupled to the top surface of the fixed plate to cover the circuit unit, with a second rod insertion hole configured to penetrate the control rod there through.

7. The calibrator according to claim 6, further comprising:
   a guide pole formed in a top surface of the middle cover, wherein the rotary plate comprises a hole configured to insert the guide pole therein, and
   the movable frame further comprises a guide pole insertion hole configured to insert the guide pole therein.

8. The calibrator according to claim 7, further comprising:
   a flexible member coupled to an end of the guide pole to push the movable frame downward.

9. The calibrator according to claim 7, wherein the guide pole is provided in an outer position with respect to a rotational center of the rotary plate, and
   the hole of the rotary plate is formed in an arc shape with respect to a rotation axis of the rotary plate.

10. The calibrator according to claim 5, wherein the rotary portion comprises,
    a top cover configured to cover the movable frame and coupled to the rotary plate to rotate together with the rotary plate.

11. The calibrator according to claim 10, wherein the top cover further comprises,
    a hook projected downward, with a hooking protrusion formed in an end thereof, and the rotary plate comprises a hook insertion hole configured to penetrate the hook there through, and the middle cover further comprises a hooking hole formed in an inner surface of the middle cover to hook a hooking protrusion of the hook therein.

12. The calibrator according to claim 11, wherein the hook is provided in an outer position with respect to a rotation center of the rotary portion, and the hooking hole is formed in an arc shape corresponding to the distance where the hook moves by the rotation of the rotary portion.

13. The calibrator according to claim 10, wherein the top cover further comprises, a plurality of grooves formed in a circumferential portion thereof.

14. The calibrator according to claim 1, wherein the absorption plate is formed in a donut shape having a hole formed in a central portion, the first portion is formed in a ring shape provided in a middle portion of the donut shape of the absorption plate, and the second portion is formed in an inner circumference and an outer circumference of the donut shape of the absorption plate.

15. The calibrator according to claim 1, wherein three or more circular absorption plates are arranged in a circular shape, and the first portion is a central portion of the absorption plate, and the second portion is an outer circumferential portion of the absorption plate.

16. The calibrator according to claim 1, wherein the absorption plate further comprises, a separation protrusion projected from an end thereof.

17. The calibrator according to claim 1, wherein the circuit unit comprises a control board having a sensor configured to calibrate a color of the screen of the display device mounted therein.

* * * * *